United States Patent
LeCrone et al.

(10) Patent No.: US 11,106,605 B2
(45) Date of Patent: Aug. 31, 2021

(54) ENHANCED TAPE DRIVE COMMUNICATION

(71) Applicant: EMC IP Holding Company LLC, Hopkinton, MA (US)

(72) Inventors: Douglas E. LeCrone, Hopkinton, MA (US); Paul A. Linstead, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 126 days.

(21) Appl. No.: 16/391,431

(22) Filed: Apr. 23, 2019

(65) Prior Publication Data

US 2020/0341915 A1 Oct. 29, 2020

(51) Int. Cl.
*G06F 13/16* (2006.01)
*G06F 13/38* (2006.01)
*G06F 3/06* (2006.01)
*G06F 16/182* (2019.01)

(52) U.S. Cl.
CPC .......... *G06F 13/1668* (2013.01); *G06F 3/061* (2013.01); *G06F 3/0659* (2013.01); *G06F 3/0664* (2013.01); *G06F 3/0686* (2013.01); *G06F 13/382* (2013.01); *G06F 16/183* (2019.01); *G06F 2213/0042* (2013.01)

(58) Field of Classification Search
CPC .... G06F 13/00; G06F 13/1668; G06F 13/382; G06F 16/183; G06F 12/00; G06F 3/061; G06F 3/0659; G06F 3/0664; G06F 3/0686
See application file for complete search history.

(56) References Cited

U.S. PATENT DOCUMENTS

| | | | |
|---|---|---|---|
| 6,070,224 A | 5/2000 | LeCrone et al. | |
| 2003/0126309 A1* | 7/2003 | Gamble | G06F 21/78 719/321 |
| 2008/0133827 A1* | 6/2008 | Topham | G06F 11/1464 711/111 |
| 2010/0058465 A1* | 3/2010 | Johnson | G06F 3/0629 726/21 |
| 2018/0089023 A1* | 3/2018 | Wong | G06F 11/1064 |

OTHER PUBLICATIONS

U.S. Appl. No. 16/516,558, filed Jul. 19, 2019, LeCrone, et al.
U.S. Appl. No. 16/391,930, filed Apr. 23, 2019, LeCrone, et al.

* cited by examiner

*Primary Examiner* — Tuan V Thai
(74) *Attorney, Agent, or Firm* — Muirhead and Saturnelli, LLC

(57) ABSTRACT

Communicating with a tape drive emulation unit that communicates using command mode or transport mode includes the tape drive emulation unit receiving an inquiry about whether the tape drive emulation unit communicates using transport mode, the tape drive emulation unit responding to the inquiry by indicating that the tape drive emulation unit does communicate using transport mode, and the tape drive emulation unit servicing transport mode commands until receiving a release command. The tape drive emulation unit may include a front end component, a data mover/server, and a tape emulation storage device. The data mover/server may include an NFS server. A host may communicate with the tape emulation unit. The host and the tape emulation unit may be coupled using a FICON connection. A host application may send commands to the tape emulation unit and may receive commands from the tape emulation unit using command mode.

17 Claims, 8 Drawing Sheets

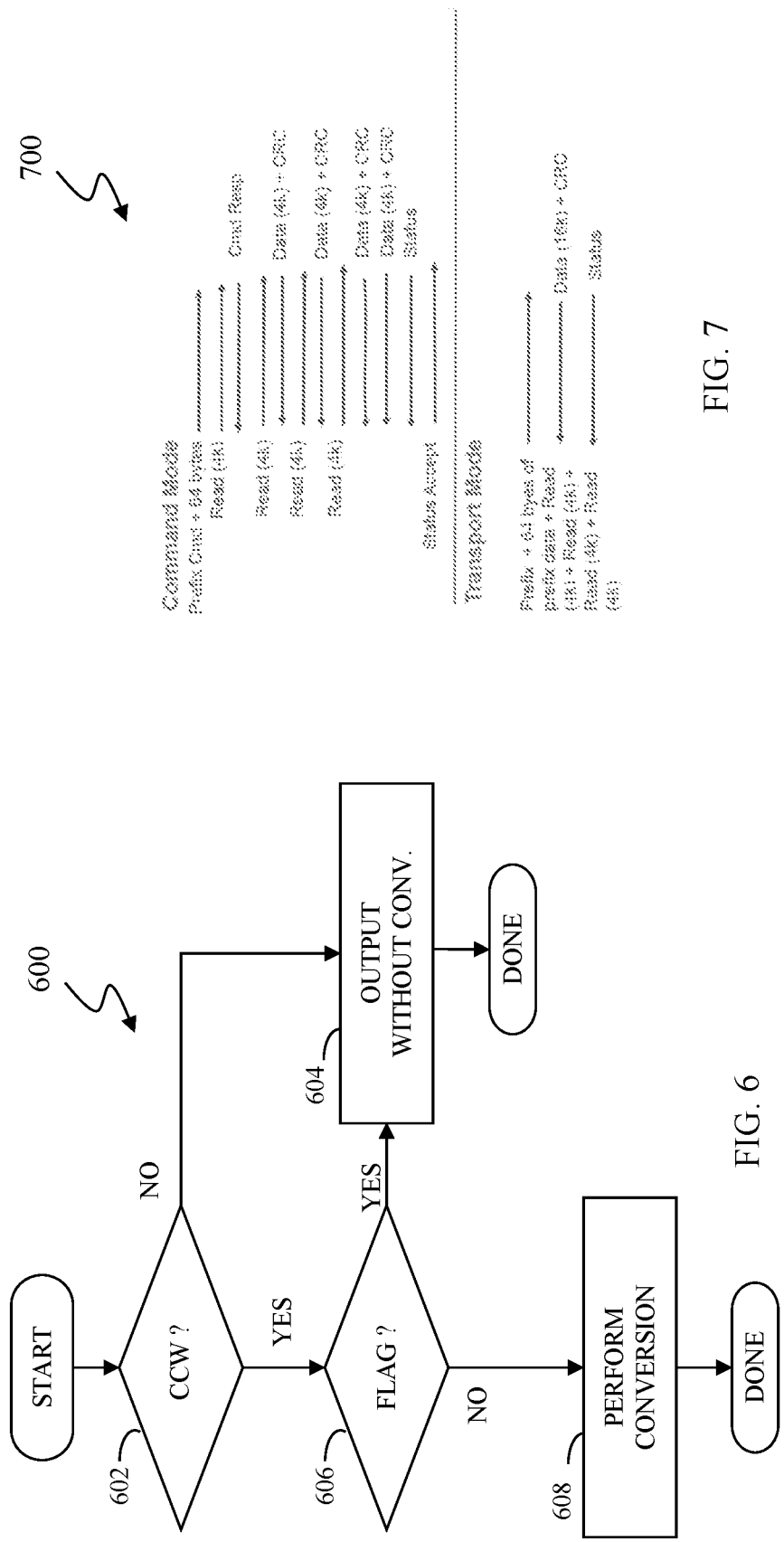

ENHANCED TAPE DRIVE COMMUNICATION

TECHNICAL FIELD

This application relates to the field of computer systems and storage devices therefor and, more particularly, to the field of storage access and I/O operations among computing systems and storage devices including tape drives.

BACKGROUND OF THE INVENTION

Host processor systems may store and retrieve data using a storage device containing a plurality of host interface units (I/O modules), physical storage units (e.g., disk drives, solid state drives), and disk interface units (disk adapters). The host systems access the storage device through a plurality of channels provided therewith. Host systems provide data and access control information through the channels to the storage device and the storage device provides data to the host systems also through the channels. The host systems do not address the physical storage units of the storage device directly, but rather, access what appears to the host systems as a plurality of logical volumes. The logical volumes may or may not correspond to the physical storage units. Allowing multiple host systems to access the single storage device unit allows the host systems to share data stored therein.

Communication between a host processor system and a storage device may be performed using a connection protocol, such as FICON, where command mode control and status information is exchanged between the host processor system and the storage device to facilitate exchanging data between the host and the storage device. The control and status information includes instructions provided by the host to the storage device such as instructions to read data, instructions to write data, etc. and includes status information returned by the storage device to the host in response thereto.

The FICON protocol has been updated to use transport mode control and status information that is exchanged between the host processor system and the storage device to facilitate exchanging data between the host and the storage device. The transport mode protocol is more efficient for transferring data than the command mode protocol because the transport mode protocol relies on less back and forth communication between the entities and, in some cases, uses less commands/status returns than comparable commands/status returns used for command mode data transfers. A significant number of storage devices have been reconfigured to use the transport mode protocol. Similarly, drivers for host systems have been rewritten to use transport mode in a way that does not require any rewriting/adjustment of applications that use the drivers in a conventional manner (i.e., applications that make conventional high level driver calls such as read, write, put, get, etc.).

Some devices, such as some types of tape drives, have not been updated to use transport mode. Applications on a host that communicate with these devices are written in a way that bypasses high level driver calls to directly call low level routines to transmit command mode data and receive back command mode status information. Of course, just as with drivers on a host, it may be possible to rewrite the applications to use transport mode, but this is not useful if the device still communicates using command mode. Furthermore, in some cases, the applications are controlled by third parties that do not plan to rewrite the applications to use transport mode.

Accordingly, it is desirable to provide a mechanism allow transport mode communication between a tape drive and a host having one or more tape drive applications that use command mode to communicate with tape drives.

SUMMARY OF THE INVENTION

According to the system described herein, communicating with a tape drive emulation unit that communicates using command mode or transport mode includes the tape drive emulation unit receiving an inquiry about whether the tape drive emulation unit communicates using transport mode, the tape drive emulation unit responding to the inquiry by indicating that the tape drive emulation unit does communicate using transport mode, and the tape drive emulation unit servicing transport mode commands until receiving a release command. The tape drive emulation unit may include a front end component, a data mover/server, and a tape emulation storage device. The data mover/server may include an NFS server. A host may communicate with the tape emulation unit. The host and the tape emulation unit may be coupled using a FICON connection. A host application may send commands to the tape emulation unit and may receive commands from the tape emulation unit using command mode. The host may convert command mode control words into transport mode control words prior to transmitting the control words to the tape emulation unit. The host application may directly provide the command mode control words to one of: an ssch layer or a channel subsystem layer.

According further to the system described herein, a non-transitory computer-readable medium contains software that communicates with a tape drive emulation unit that communicates using command mode or transport mode. The software includes executable code that receives an inquiry about whether the tape drive emulation unit communicates using transport mode, executable code that responds to the inquiry by indicating that the tape drive emulation unit does communicate using transport mode, and executable code that services transport mode commands until receiving a release command. The tape drive emulation unit may include a front end component, a data mover/server, and a tape emulation storage device. The data mover/server may include an NFS server. A host may communicate with the tape emulation unit. The host and the tape emulation unit may be coupled using a FICON connection. A host application may send commands to the tape emulation unit and may receive commands from the tape emulation unit using command mode. The host may convert command mode control words into transport mode control words prior to transmitting the control words to the tape emulation unit. The host application may directly provide the command mode control words to one of: an ssch layer or a channel subsystem layer.

According further to the system described herein, a tape emulation unit includes a tape emulation storage device, a data mover/server coupled to the tape emulation storage device, and a front end component coupled to the data mover/server and including a non-transitory computer-readable medium containing software that communicates using command mode or transport mode, the software including executable code that receives an inquiry about whether the tape drive emulation unit communicates using transport mode, executable code that responds to the inquiry by indicating that the tape drive emulation unit does communicate using transport mode, and executable code that services transport mode commands until receiving a release command. The data mover/server may include an NFS server. A host may communicate with the tape emulation unit. The host and the tape emulation unit may be coupled using a FICON connection. A host application may send commands to the tape emulation unit and may receive commands from the tape emulation unit using command mode. The host may convert command mode control words into transport mode control words prior to transmitting the control words to the tape emulation unit. The host application may directly provide the command mode control words to one of: an ssch layer or a channel subsystem layer.

BRIEF DESCRIPTION OF THE DRAWINGS

Embodiments of the system are described with reference to the several figures of the drawings, noted as follows.

FIG. 6 is a flow diagram illustrating processing performed in connection with converting command mode I/O operations into transport mode I/O operations according to an embodiment of the system described herein.

FIG. 7 is a schematic diagram illustrating a difference between command mode I/O operations and equivalent transport mode I/O operations according to an embodiment of the system described herein.

DETAILED DESCRIPTION OF VARIOUS EMBODIMENTS

The system described herein converts command mode I/O operations for a tape drive into transport mode I/O operations for a tape drive by intercepting data being transmitted and received by a tape drive application on a host to communicate with a tape emulation unit that has been reconfigured to communicate using transport mode. Accordingly, the system may take advantage of the benefits of transport mode I/O even though an application that communicates with a tape drive has been written to directly exchange command mode I/O instructions and status with the tape drive.

Figure 1:
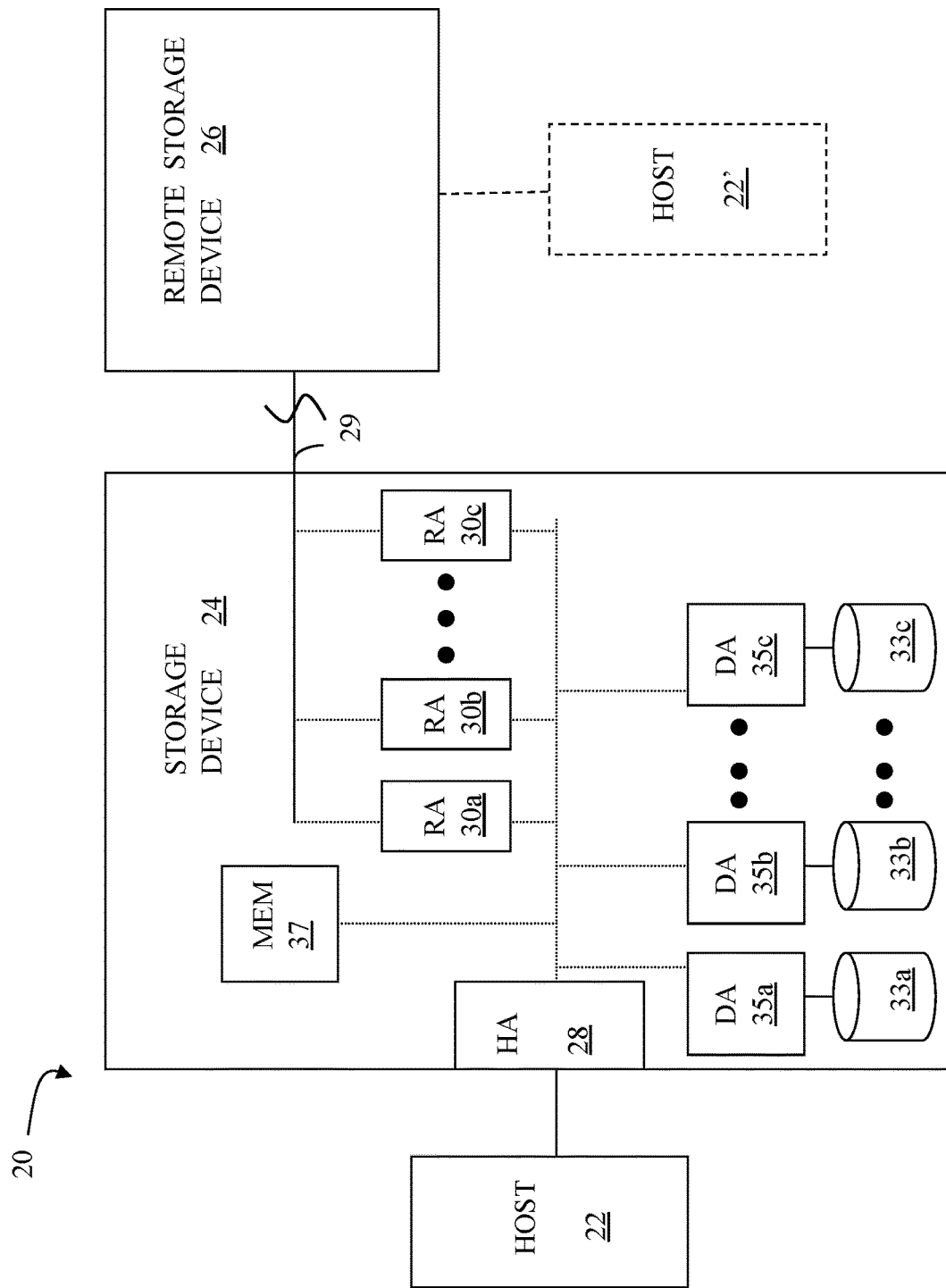
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix or VMAX storage system produced by Dell EMC of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include one or more physical storage units (including disks, solid state storage devices, etc.), each containing a different portion of data stored on the storage device 24. FIG. 1 shows the storage device 24 having a plurality of physical storage units 33a-33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown in FIG. 1). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage device 24. Note that, in other embodiments, it is possible for more than one physical storage unit to be serviced by a DA and that it is possible for more than one DA to service a physical storage unit. The storage device 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage device 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage device 26 may be subdivided into a plurality of volumes or logical devices, where each of the logical devices may or may not correspond to one or more physical storage units of the remote storage device 26.

In some embodiments, an other host 22' may be provided. The other host 22' is coupled to the remote storage device 26 and may be used for disaster recovery so that, upon failure at a site containing the host 22 and the storage device 24, operation may resume at a remote site containing the remote storage device 26 and the other host 22'. In some cases, the host 22 may be directly coupled to the remote storage device 26, thus protecting from failure of the storage device 24 without necessarily protecting from failure of the host 22.

Figure 2:
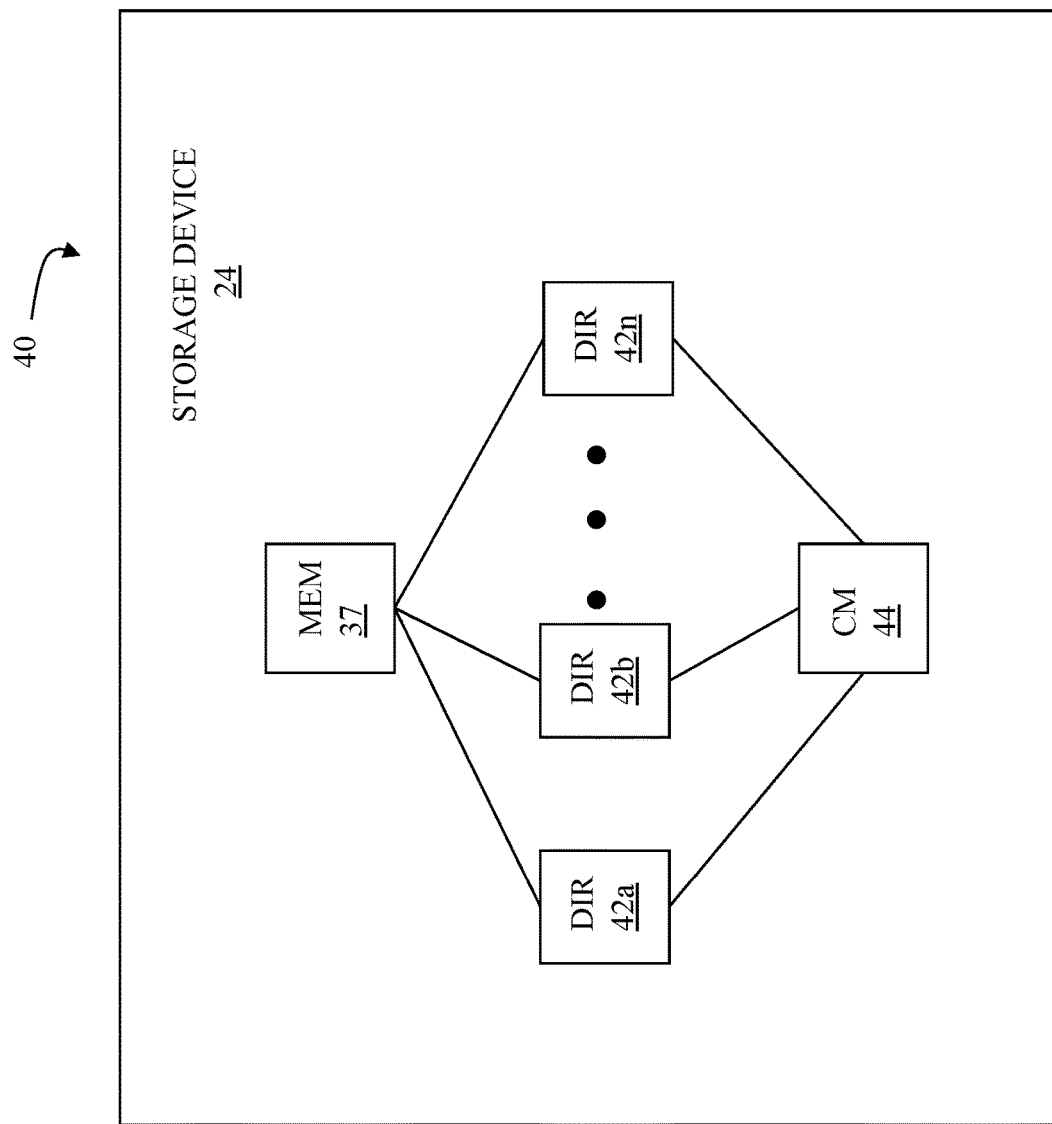
FIG. 2 is a schematic diagram illustrating an embodiment of a storage device where each of a plurality of directors are coupled to a memory according to an embodiment of the system described herein.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The switches may be programmed to allow connections between specific ports of devices coupled to the switches. A port that can initiate a data-path connection may be called an "initiator" port while the other port may be deemed a "target" port.

Figure 3:
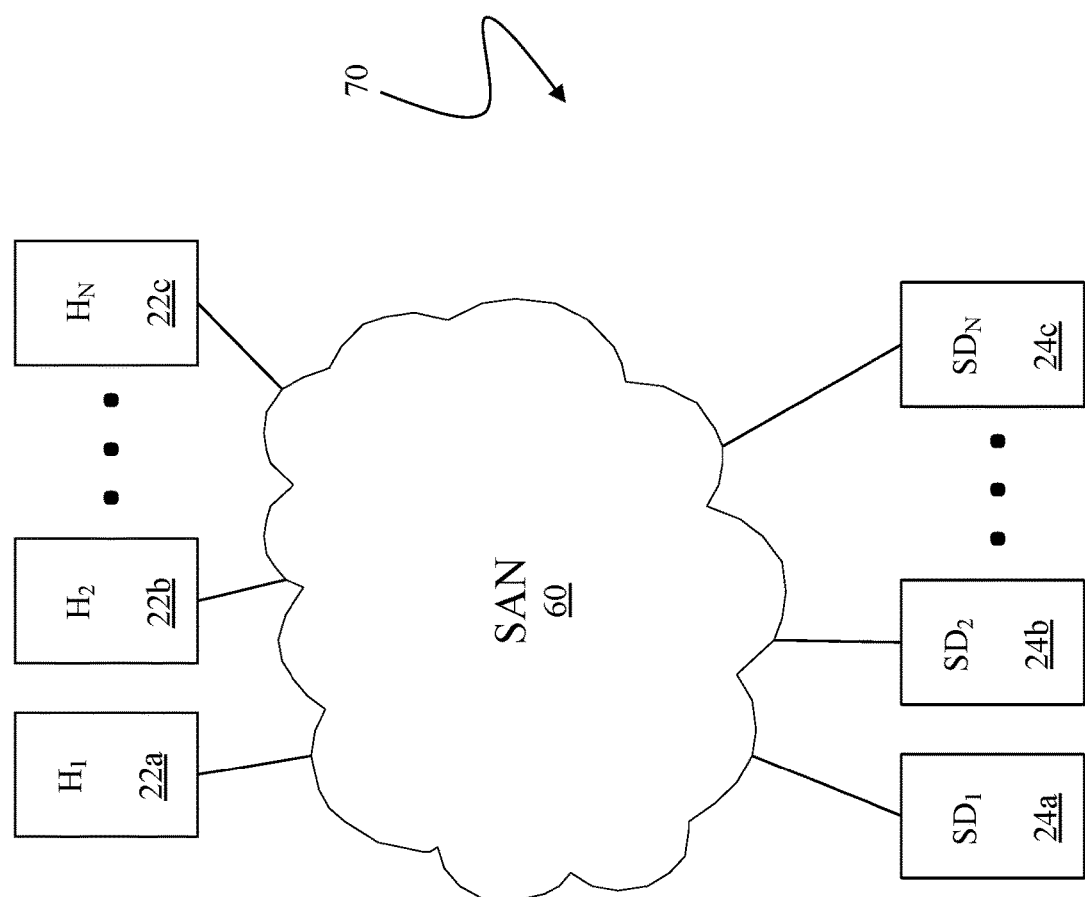
FIG. 3 is a schematic illustration showing a storage area network (SAN) providing a SAN fabric coupling a plurality of host devices to a plurality of storage devices that may be used in connection with an embodiment of the system described herein.

FIG. 3 is a schematic illustration 70 showing a storage area network (SAN) 60 providing a SAN fabric coupling a plurality of host devices ($H_1$-$H_N$) 22a-c to a plurality of storage devices ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage device 24a. Upon becoming activated (e.g., powering up), the host 22a and the storage device 24a may send appropriate signals to the switch(es) of the storage area network 60, and each other, which then allows the host 22a to initiate a data-path connection between the port of the host 22a and the port of the storage device 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from Dell EMC.

Figure 4:
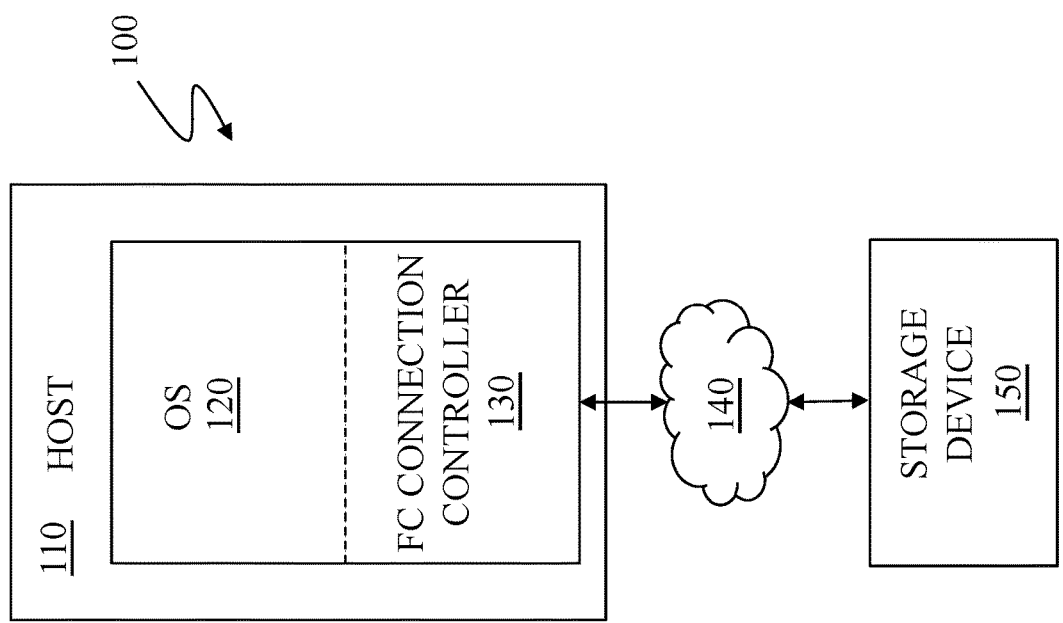
FIG. 4 is a schematic illustration showing a system with a FICON connection between a host and a storage device according to an embodiment of the system described herein.

FIG. 4 is a schematic illustration showing a system 100 with a controller 130 for providing a FICON connection (a zHPF connection) between a host 110 and a storage device 150 according to an embodiment of the system described herein. The host 110 is similar to the hosts 22, 22', discussed above and the storage device 150 is similar to the storage devices 24, 26, discussed above. In an embodiment, the host 110 may be a computer running Linux, z/OS or some other appropriate operating system 120. The I/O processing on the host 110 may cooperate with the controller 130 to enable I/O operations with a storage device 150, that is similar to the storage device 24. The controller 130 may send and receive data to and from the storage device 150 using a remote connection mechanism 140, that may include a network (such as the Internet, and appropriate connection thereof). The storage device 150 may include physical storage volumes and/or logical volumes, such as Dell EMC Corporation's VMAX or Symmetrix data storage facility. The controller 130 may act as an I/O subsystem providing FICON (zHPF) communication capability. The storage device 150 may include features and/or components enabling communication with the host 110. For a discussion of features and implementations of FICON systems and suitable Fibre channel protocols operating therewith on z/Architecture computing systems, reference is made to J. Entwistle, "IBM System z10 FICON Express8 FCP Channel Performance Report," Technical paper, August 2009, 27 pp., which is incorporated herein by reference.

It is noted that various components of the system 100 may be emulated. For further discussion of emulation of I/O computing components, reference is made to U.S. Pat. No. 9,665,502 to Jones et al., issued on May 30, 2017 and entitled "Virtual I/O Hardware" and U.S. Pat. No. 9,170,904 to LeCrone et al., issued on Oct. 27, 2015 and entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism 140 may include an Internet connection and/or possibly some other types of connection(s). In an embodiment herein, the connection mechanism 140 may be directly incompatible with a FICON connection. The incompatibility may be hardware incompatibility, software incompatibility, or both. Such connection mechanism 140 may not support a direct FICON connection but, instead, rely on a FICON emulator (and/or other emulator(s)) for providing data in an appropriate format. It is further noted that where FICON emulation is being performed, the storage device 150 may include or be coupled to a FICON emulator portion that may send and receive data to and from the connection mechanism 140 and also emulates a Fibre Channel FC0 physical layer for the benefit of the storage device 150. Thus, in cases involving emulation, both the host 110 and the storage device 150 may operate as if the devices 110, 150 were communicating using a FICON hardware connection. In other embodiments, the connection mechanism 140 may be directly compatible with FICON and may be implemented using, for example, a Fibre Channel cable.

In an embodiment, the system described herein may be used with IBM's z High Performance FICON (zHPF) transport mode protocol implementation. zHPF enhances z/Architecture and FICON interface architecture to improve data transfer processing. In z/OS, standard FICON architecture operates with the command mode (CM) protocol, and a zHPF architecture operates with the transport mode (TM) protocol. The zHPF protocol provides a Transport Control Word (TCW) that facilitates the processing of an I/O request by the channel and the controller. The TCW enables multiple channel commands to be sent to the controller as a single unit (instead of being sent as separate commands as in a FICON channel command word (CCW)). The channel no longer has to process and keep track of each individual CCW. The channel forwards a chain of commands to the controller for execution. zHPF capable channels may support both FICON and zHPF protocols simultaneously and thus may support the simultaneous use of CCWs and TCWs. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

Figure 5:
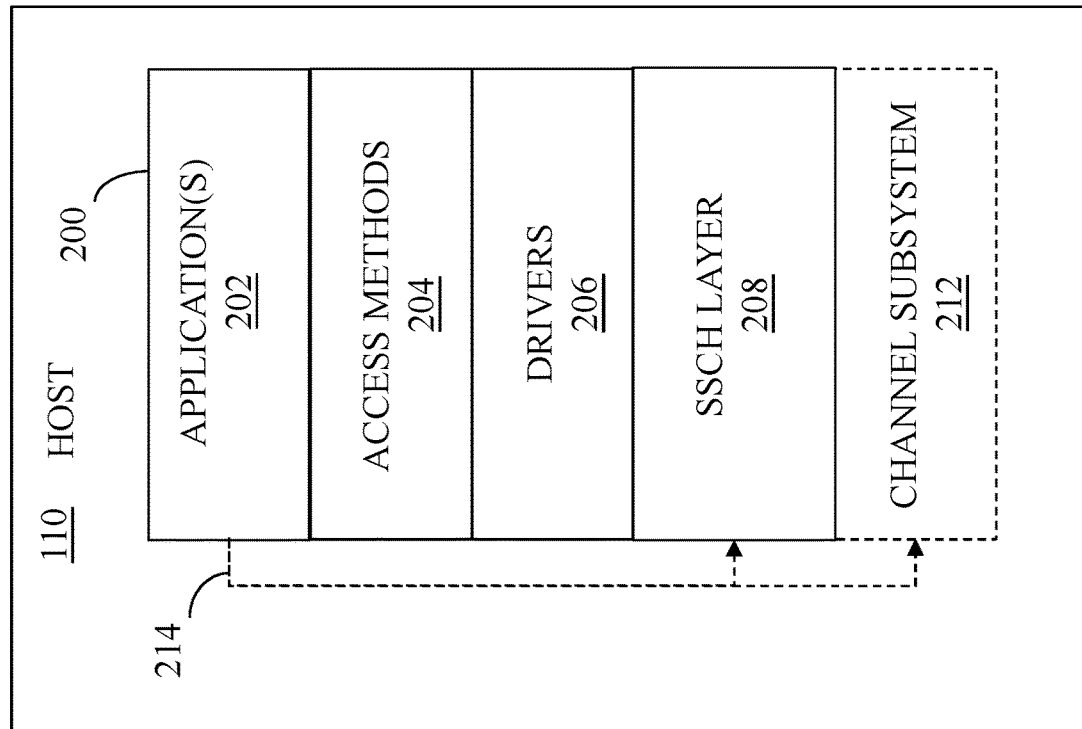
FIG. 5 is a schematic illustration showing software layers in a host according to an embodiment of the system described herein.

Referring to FIG. 5, the host 110 is illustrated with software 200 having an application(s) layer 202, an access methods layer 204, a drivers layer 206, an SSCH layer 208, and a channel subsystem layer 212. The application(s) layer 202 includes one or more software applications that run on the host 110. The access methods layer 204 includes I/O routines (e.g., read, write, open, etc.) that are used by applications in the application(s) layer 202 in connection with performing I/O operations. Software in the application(s) layer 202 calls specific routines in the access methods layer 204 to access data on a storage device coupled to the host.

The I/O routines in the access methods layer 204 call driver routines in the drivers layer 206 that perform lower-level device specific operations that depend upon the specific type of I/O device and the type of connection thereto. For example, a first driver for a Symmetrix storage device coupled to the host 110 by a FICON connection may be different than a second driver used for a different type of non-volatile storage device coupled to the host 110 using a different type of connection. Note, however, that an application in the application layer 202 may call the same routine (e.g., read) in the access layer 204 irrespective of the physical hardware (and connection there) used for the data, but that the routine in the access layer 204 that is called may call different routines in the SSCH layer 208, depending upon a specific configuration/hardware of the system.

The SSCH layer 208 includes routines that perform low-level operations that make calls to the channel subsystem layer 212 to directly control the hardware used for I/O operations, including any storage devices and channels used from transferring data between the host 110 and the storage devices. Routines in the drivers layer 206 call routines in the SSCH layer 208 to perform hardware operations and to transfer data to and from the host 110 and to exchange status and control information to facilitate control of the I/O hardware.

It is possible to modify the drivers layer 206 to take advantage of the efficiencies of zHPF by causing high level driver operations (e.g., put, get, etc.) to form TCWs (rather than CCWs) that are passed on to the SSCH layer 208 and to the channel subsystem layer 212. Applications in the applications layer 202 do not need to be modified and may continue to make the same calls to the access methods layer 204 (e.g., read, write, etc.) irrespective of whether the driver layer 206 forms CCWs or TCWs. However, there may be a subset of applications in the applications layer 202 that do not perform I/O operations by calling high level routines in the access methods layer 204. Rather, the subset of applications performs I/O operations by directly calling low level I/O routines at the SSCH layer 208 and/or directly accessing the channel subsystem layer 212. This is illustrated by a path 214 from the applications layer 202 to either the SSCH layer 208 or the channel subsystem layer 212. Note that at least some of the subset of applications that bypass the driver layer 206 may use CCWs even though, in at least some cases, it would be advantageous to use TCWs and zHPF instead.

Referring to FIG. 6, a flow diagram 600 illustrates processing performed at the SSCH layer 208 or the channel subsystem layer 212 to convert at least some Command Mode (CM) operations into Transport Mode (TM) operations. This may be advantageous in instances where an application bypasses the driver layer and provides CCWs directly to the SSCH layer 208 or the channel subsystem layer 212. The processing illustrated by the flow diagram 600 may be performed just prior to control words being output by the channel subsystem layer 212 to the Fibre connection (or similar) or just prior to the SSCH layer 208 providing the control words to the channel subsystem layer 212. Note that, in some instances, such a conversion may not be desirable. For example, for an application that is performing I/O operations with a device that only accepts CCWs (e.g., legacy tape drive), the CCWs should not be converted to TCWs. Accordingly, a flag may be provided that indicates whether CCWs should be converted to TCWs. This is described in more detail elsewhere herein.

Processing begins at a step 602 where it is determined if a CCW is being output. If not, then control passes from the test step 602 to a step 604 where the data is output without any conversion or processing. Following the step 604, processing is complete. If it is determined at the step 602 that the data being output is a CCW, then control transfers from the test step 602 to a test step 606 where it is determined if a flag is set indicating that a particular CCW or set of CCWs (e.g., CCWs used for I/O with a device that does not accept/use TCWs) should not be converted. If so, then control passes from the test step 606 to the step 604, discussed above, where the data is output without any conversion or processing. Following the step 604, processing is complete.

If it is determined at the step 606 that the flag that suppresses conversion is not set (i.e., conversion is supposed to occur), then control transfers from the step 606 to a step 608 where CM commands and status messages are converted into TM commands and status messages. Following the step 608, processing is complete. The operations performed at the step 608 are discussed in more detail elsewhere herein. Note, however, that the conversion is not a one for one replacement. Rather, the number of TM commands and status messages is expected to be significantly less than the number of CM commands and status messages, which is consistent with the purpose of the conversion—to reduce the communication overhead in connection with I/O operations.

Referring to FIG. 7, a diagram 700 illustrates conversion of a series of CM commands and status messages to an equivalent series of TM commands and status messages. The commands illustrated in the diagram 700 are provided by the host 110 to read 16 k bytes of data from the storage device 150. Note that, in the case of the CM commands and status messages, the host 110 first sends a prefix command followed by four separate 4k read commands and receives a 4k data response with CRC from the storage device 150 for each read command. The storage device 150 then sends a status message to the host 110 and the host 110 provides to the storage device 150 a corresponding response thereto. The host 110 then sends a status accept message to the storage device 150. In contrast to the CM commands and status messages, for the TM commands and status messages, the host 110 reads 16 k bytes from the storage device 150 using a single command from the host 110 to the storage device 150 and returning data contains message with 16$k$ data and a CRC along with a separate status message from the storage device 150 to the host 110.

Figure 8:
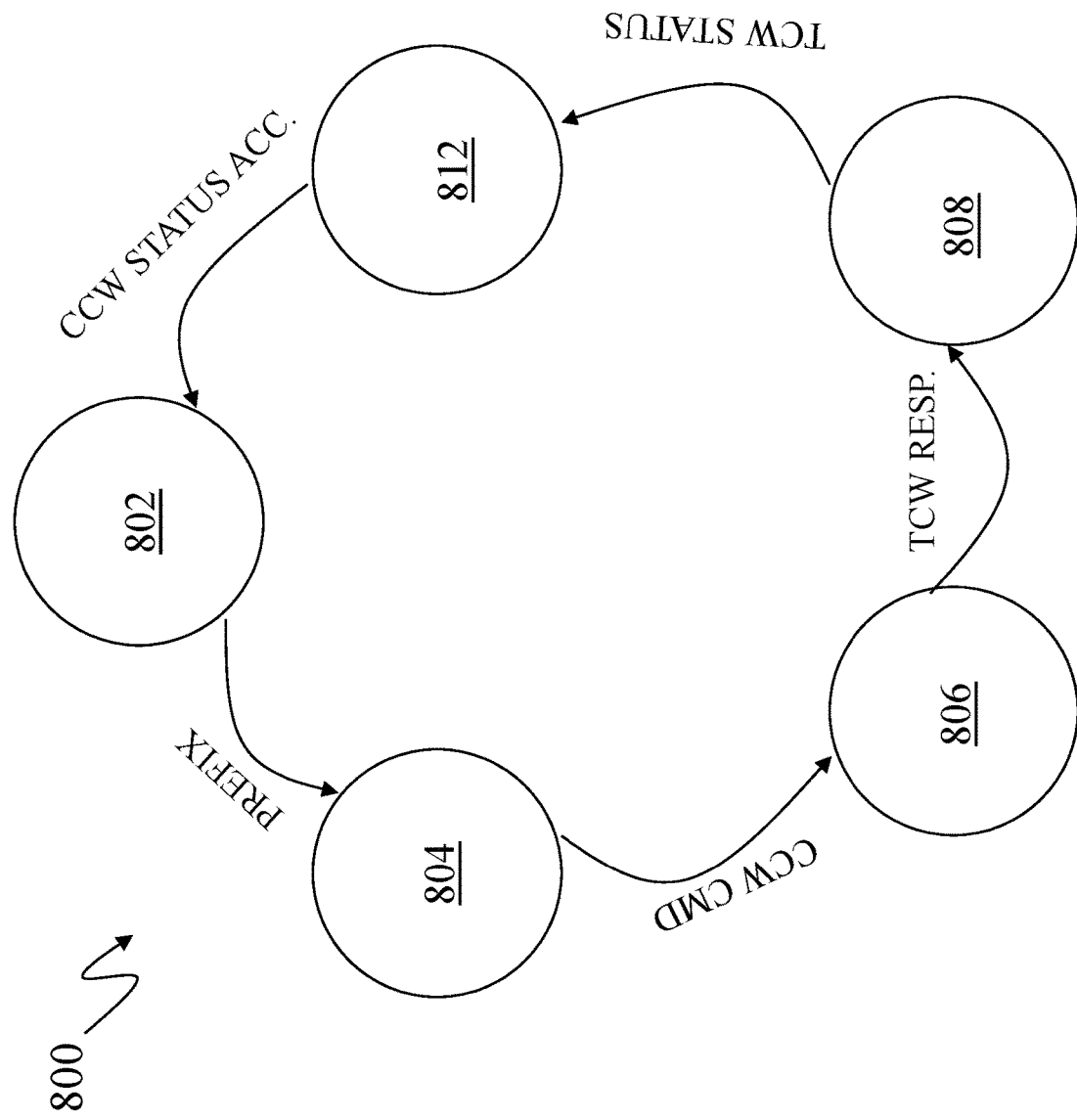
FIG. 8 is a state diagram illustrating in more detail converting command mode I/O operations into transport mode I/O operations according to an embodiment of the system described herein.

Referring to FIG. 8, a state diagram 800 illustrates in more detail processing performed at the step 608 where CM commands and status messages are converted to TM commands and status messages. At a first state 802, which is an initial state, the system waits to receive a command mode prefix command from the host 110. The first state 802 transitions into a second state 804 upon receipt of the prefix command. At the second state 804, the system receives the CCW commands from the host 110. The CCW commands are expected from the host 110 based on the prefix command. Receipt of the last of the CCW commands causes the system to transition from the second state 804 to a third state 806 where a TCW command, corresponding to the CCW prefix and commands, is transmitted (e.g., to the storage device 150).

The third state 806 transitions into a fourth state upon receipt of a TM response message destined for the host 110 (e.g., a TM response message from the storage device 150). At the fourth state 808, the system generates and provides to the host 110 one or more CM response messages that correspond to the received TM response message. For example, if the TM response message corresponds to a data being read, then the CM response message(s) provided by system to the host 110 include the data that was read. The fourth state 808 transitions to a fifth state 812 upon receipt of a TM status message destined for the host 110 (e.g., a TM status message from the storage device 150). At the fifth state 812, the system generates and provides to the host 110 one or more CM status messages that correspond to the received TM status message. For example, if the TM status message corresponds to a successful read operation, then the CM status message(s) provided by system indicate to the host 110 that a successful read operation has occurred. The fifth state 812 transitions back to the initial state 802 upon receipt of a CCW status accept message from the host 110.

Figure 9:
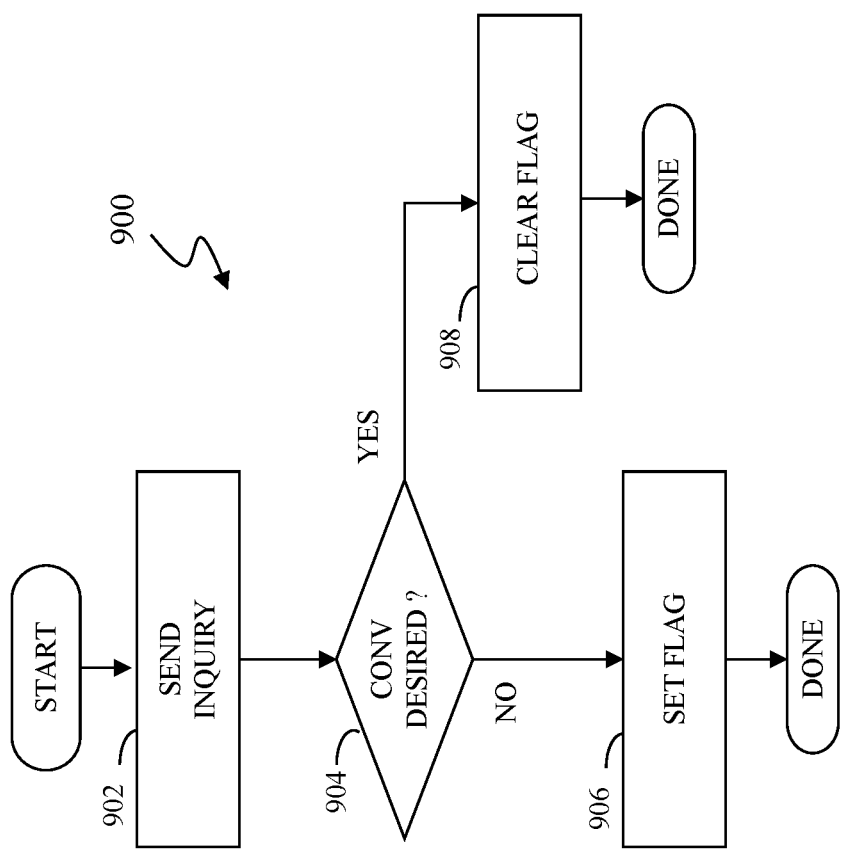
FIG. 9 is a flow diagram illustrating processing performed in connection with determining whether to convert command mode I/O operations into transport mode I/O operations according to an embodiment of the system described herein.

Referring to FIG. 9, a flow diagram 900 illustrates in more detail processing performed in connection with setting or clearing the flag used in the processing illustrated by FIG. 6, described above. The flag indicates whether no conversion from CM to TM should be provided. That is, if the flag is set, then the system does not convert CCWs. Processing begins at a first step 902 where an inquire is made as to whether conversion is desired. In some cases, the inquiry may examine a setting where a user has indicated a whether to use transport mode for a particular device/channel. In other instances, the system may be automated so that the host initially inquires a connected device to determine if the device can use transport modes and/or whether the device has a particular preference. Note that it is possible for a device to be able to use transport mode but, for some reason, still have a preference for command mode.

Following the step 902 is a test step 904 where it is determined if the result of the inquiry indicates that conversion from command mode to transport mode is desired. If not, then control transfers from the step 904 to a step 906 where the flag that directs the system not to convert from command mode to transport mode for a particular channel/device is set. Following the step 906, processing is complete. If it is determined at the step 904 that the result of the inquiry indicates that conversion from command mode to transport mode is not desired, then control transfers from the step 904 to a step 908 where the flag that directs the system not to convert from command mode to transport mode for a particular channel/device is cleared so that conversion is performed for the particular channel/device. Following the step 908, processing is complete.

Figure 10:
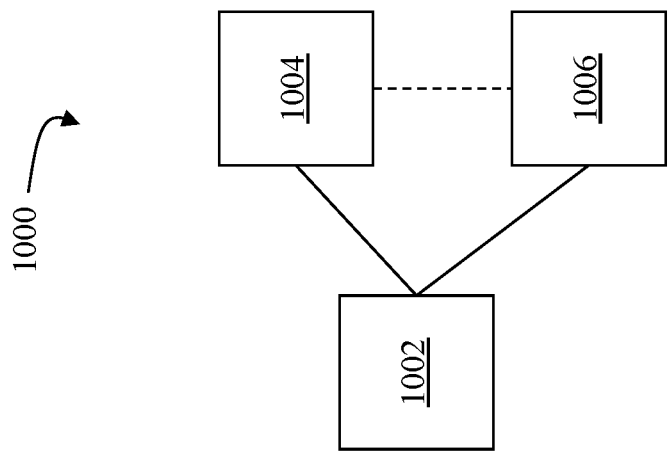
FIG. 10 is a schematic diagram illustrating system having a host, a storage device, and tape emulation unit according to an embodiment of the system described herein.

Referring to FIG. 10, a diagram 1000 shows a host 1002 coupled to a storage device 1004 and coupled to a tape emulation unit 1006. The host 1002 may be any appropriate computing device, such as an IBM System z computing device, and may be similar to the hosts 22, 22' discussed elsewhere herein. The storage device 204, which may be similar to the storage devices 24, 26 described elsewhere herein, may be any storage device capable of providing the functionality described herein, such as a storage array provided by Dell EMC of Hopkinton, Mass. The tape emulation unit 1006 provides tape emulation functionality to the host 1002 so that applications on the host 1002 that access tape data write tape data and commands to the tape emulation unit 1006 and read tape data and status from the tape emulation unit 1006 as if the tape emulation unit 1006 were an actual computer tape device. The tape emulation unit 206 may be implemented using any appropriate device, such as the DLm8500 device provided by Dell EMC of Hopkinton, Mass. Tape emulation is described, for example, in U.S. Pat. No. 6,070,224 titled: "Virtual Tape System" to LeCrone, et al., which is incorporated by reference herein. In some instances, the storage device 1004 may communicate directly with the tape emulation unit 1006. Note that, although only a single host 1002, a single storage device 1004, and a single tape emulation unit 1006 are shown, it is understood by one of ordinary skill in the art that the system may be extended to have more than one of each.

Figure 11:
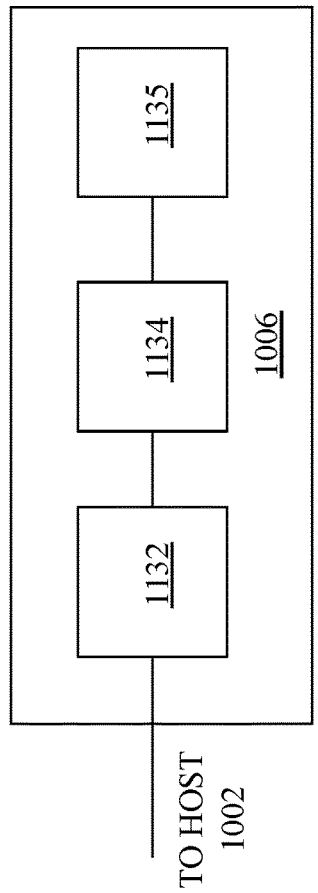
FIG. 11 is a schematic diagram illustrating a tape emulation unit according to an embodiment of the system described herein.

Referring to FIG. 11, the tape emulation unit 1006 is shown in more detail as including a front end component 1132, a data mover/server 1134, and a tape emulation storage device 1135 coupled thereto. The front end component 1132 may include a FICON link that may be couple to the host 1006 for data communication between the host 1002 and the tape emulation unit 1006. Other types of links may be used. The front end component 1132 may include FICON link emulation functionality as well as tape emulation functionality, such as the functionality provided by components of the DLm8500.

The data mover/server 1134 may be coupled to the front end component 1132 using, for example, a GigE switch while the storage device 1135 is coupled to the data mover/server 1134 using any appropriate protocol, such as Fibre Channel. The data mover/server 1134 may be accessed by the front end component 1132 using any appropriate protocol, such as NFS (Network File System). In an embodiment herein, the data mover/server 1134 may include an NFS server, such as a Celera data mover, and the storage device 1135 may be a Clarion or Symmetrix data storage array. There may be other components used instead of, and/or in addition to, the NFS server and the data storage array.

Figure 12:
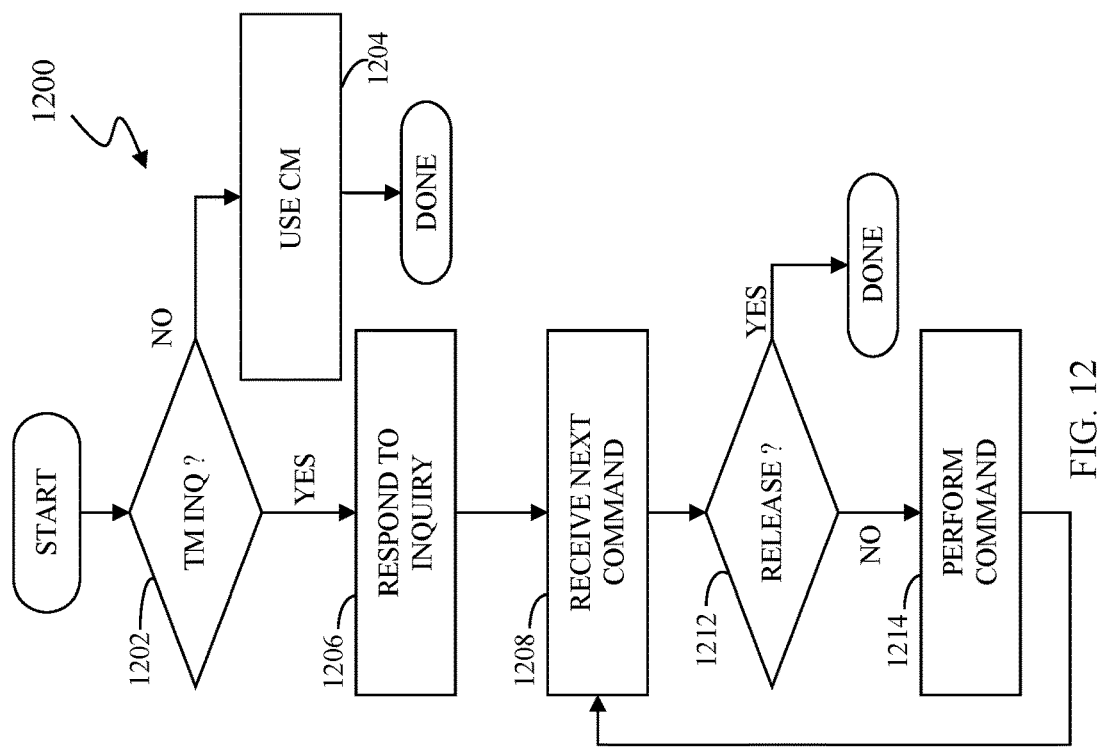
FIG. 12 is a flow diagram illustrating processing performed at a tape emulation unit in connection with exchanging tape commands and status information with a host using transport mode according to an embodiment of the system described herein.

Referring to FIG. 12, a flow diagram 1200 illustrates processing performed at the tape emulation unit 1006 in connection with exchanging tape commands and status information with the host 1002 using transport mode. Processing begins at a first test step 1202 where it is determined if the tape emulation unit 1006 has received an inquiry from the host 1002 to determine whether the tape emulation unit 1006 can communicate using transport mode. Sending an inquiry from a host regarding the capabilities of a connected device is discussed above in connection with the step 902 of FIG. 9. If it is determined at the test step 1202 that no inquiry has been received, then control transfers from the test step 1202 to a step 1204 where the system reverts to using command mode in a conventional manner. Following the step 1204, processing is complete. In an embodiment herein, it is assumed that a connected device that does not make an inquiry is not capable of using transport mode and will thus use conventional command mode. Note that, in other embodiments, it may be possible to assume that a connected device uses transport mode even if no inquiry is received.

If it is determined at the test step 1202 that an inquiry has been received, then control transfers from the test step 1202 to a step 1206 where a response to the inquiry is provided to indicate to a connected device (e.g., the host 1002) that the tape emulation unit 1006 is capable of communicating using transport mode. Following the step 1206 is a step 1208 where the tape emulation unit 1006 receives a next command (TCW) from the host 1002. Following the step 1208 is a test step 1212 where it is determined if received command is a release command, indicating that the process on the host 1002 that attached to the tape emulation unit 1006 is releasing the tape emulation unit 1006. If so, then processing is complete. Otherwise, control transfers from the test step 1212 to a step 1214 where the command is performed. Note that the processing provided at the step 1214 is analogous to conventional processing performed in connection with tape commands received using the command mode. In an embodiment of the system described herein, tape operation commands (e.g., read, write, advance tape, etc.) are the same or similar irrespective of whether the commands are provided using transport mode or command mode. However, as described elsewhere herein (e.g., FIG. 7 and corresponding text), using transport mode instead of command mode provides significant communication efficiencies between devices. Following the step 1214, control transfers back to the step 1208 for another iteration where a next command is received.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB)

interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of communicating with a tape drive emulation unit that communicates using command mode or transport mode, comprising:
    the tape drive emulation unit receiving an inquiry about whether the tape drive emulation unit communicates using transport mode;
    the tape drive emulation unit responding to the inquiry by indicating that the tape drive emulation unit does communicate using transport mode; and
    the tape drive emulation unit servicing transport mode commands until receiving a release command, wherein a host application sends commands to the tape emulation unit and receives commands from the tape emulation unit using command mode and wherein the host converts command mode control words into transport mode control words prior to transmitting the control words to the tape emulation unit.

2. A method, according to claim 1, wherein the tape drive emulation unit includes a front end component, a data mover/server, and a tape emulation storage device.

3. A method, according to claim 2, wherein the data mover/server includes an NFS server.

4. A method, according to claim 1, wherein a host communicates with the tape emulation unit.

5. A method, according to claim 4, wherein the host and the tape emulation unit are coupled using a FICON connection.

6. A method, according to claim 1, wherein the host application directly provides the command mode control words to one of: an ssch layer or a channel subsystem layer.

7. A non-transitory computer-readable medium containing software that communicates with a tape drive emulation unit that communicates using command mode or transport mode, the software comprising:
    executable code that receives an inquiry about whether the tape drive emulation unit communicates using transport mode;
    executable code that responds to the inquiry by indicating that the tape drive emulation unit does communicate using transport mode; and
    executable code that services transport mode commands until receiving a release command, wherein a host application sends commands to the tape emulation unit and receives commands from the tape emulation unit using command mode and wherein the host converts command mode control words into transport mode control words prior to transmitting the control words to the tape emulation unit.

8. A non-transitory computer-readable medium, according to claim 7, wherein the tape drive emulation unit includes a front end component, a data mover/server, and a tape emulation storage device.

9. A non-transitory computer-readable medium, according to claim 8, wherein the data mover/server includes an NFS server.

10. A non-transitory computer-readable medium, according to claim 7, wherein a host communicates with the tape emulation unit.

11. A non-transitory computer-readable medium, according to claim 10, wherein the host and the tape emulation unit are coupled using a FICON connection.

12. A non-transitory computer-readable medium, according to claim 7, wherein the host application directly provides the command mode control words to one of: an ssch layer or a channel subsystem layer.

13. A tape emulation unit, comprising:
    a tape emulation storage device;
    a data mover/server coupled to the tape emulation storage device; and
    a front end component coupled to the data mover/server and including a non-transitory computer-readable medium containing software that communicates using command mode or transport mode, the software including executable code that receives an inquiry about whether the tape drive emulation unit communicates using transport mode, executable code that responds to the inquiry by indicating that the tape drive emulation unit does communicate using transport mode, and executable code that services transport mode commands until receiving a release command, wherein a host application sends commands to the tape emulation unit and receives commands from the tape emulation unit using command mode and wherein the host converts command mode control words into transport mode control words prior to transmitting the control words to the tape emulation unit.

14. A tape emulation unit, according to claim 13, wherein the data mover/server includes an NFS server.

15. A tape emulation unit, according to claim 13, wherein a host communicates with the tape emulation unit.

16. A tape emulation unit, according to claim 15, wherein the host and the tape emulation unit are coupled using a FICON connection.

17. A non-transitory computer-readable medium, according to claim 13, wherein the host application directly provides the command mode control words to one of: an ssch layer or a channel subsystem layer.

* * * * *

UNITED STATES PATENT AND TRADEMARK OFFICE
CERTIFICATE OF CORRECTION

| | |
|---|---|
| PATENT NO. | : 11,106,605 B2 |
| APPLICATION NO. | : 16/391431 |
| DATED | : August 31, 2021 |
| INVENTOR(S) | : Douglas E. LeCrone et al. |

It is certified that error appears in the above-identified patent and that said Letters Patent is hereby corrected as shown below:

On the Title Page

(56) Reference Cited:
Reference 2003/0126309 A1 7/2003 Gamble, should be corrected to read "2003/0126309 A1 7/2003 Camble".

Signed and Sealed this
Twenty-third Day of August, 2022

Katherine Kelly Vidal
*Director of the United States Patent and Trademark Office*